No. 648,889. Patented May 1, 1900.
C. F. THOMAS.
CAR DOOR.
(Application filed May 29, 1899.)
(No Model.) 5 Sheets—Sheet 1.

Witnesses:
J. W. Edelin
Clifford Berryman

Inventor
Christopher F. Thomas.
by F. C. Stebbins

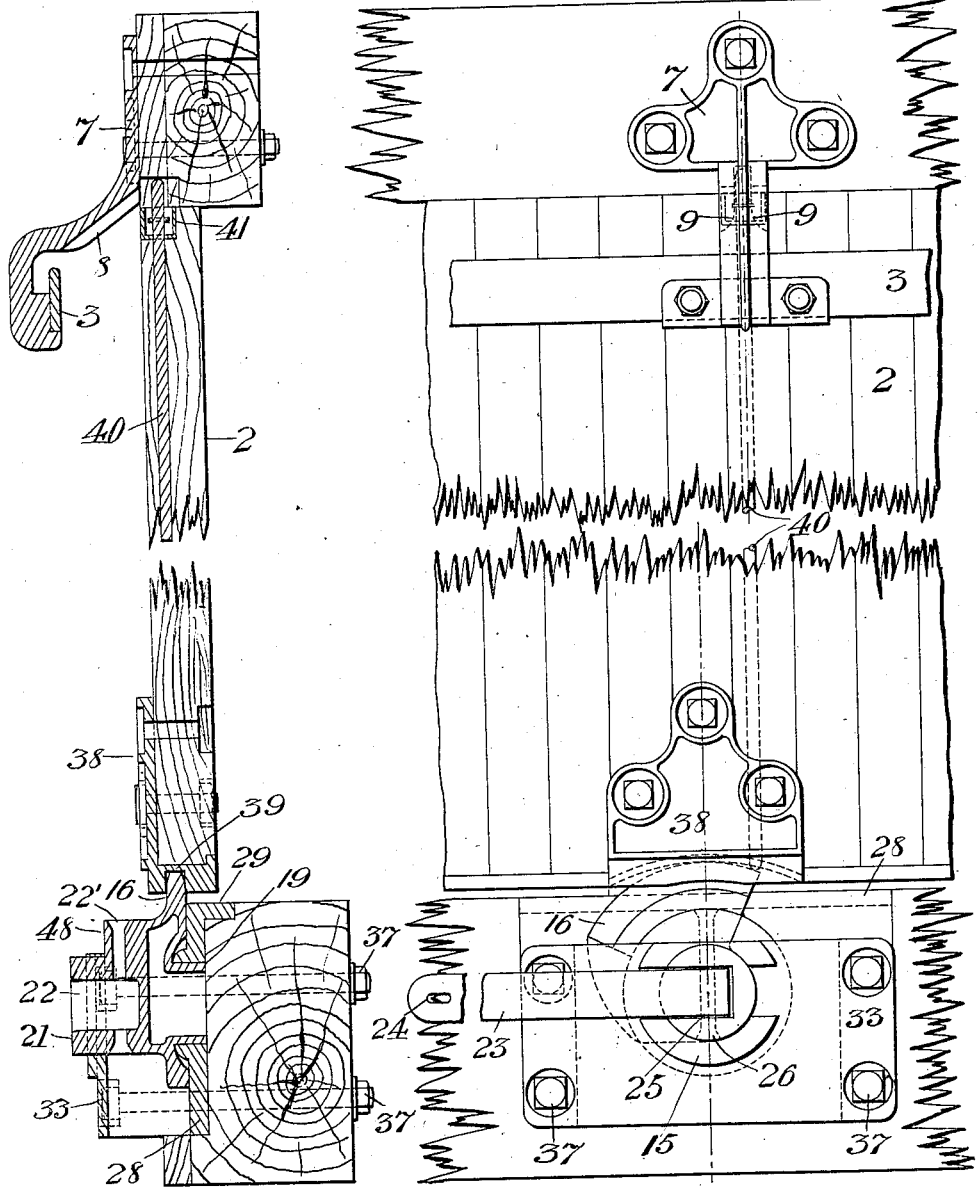

No. 648,889. Patented May 1, 1900.
C. F. THOMAS.
CAR DOOR.
(Application filed May 29, 1899.)
(No Model.) 5 Sheets—Sheet 3.

Witnesses:

Inventor:
Christopher F. Thomas.
by F. O. Stebbins,
Atty.

No. 648,889. Patented May 1, 1900.
C. F. THOMAS.
CAR DOOR.
(Application filed May 29, 1899.)
(No Model.) 5 Sheets—Sheet 4.
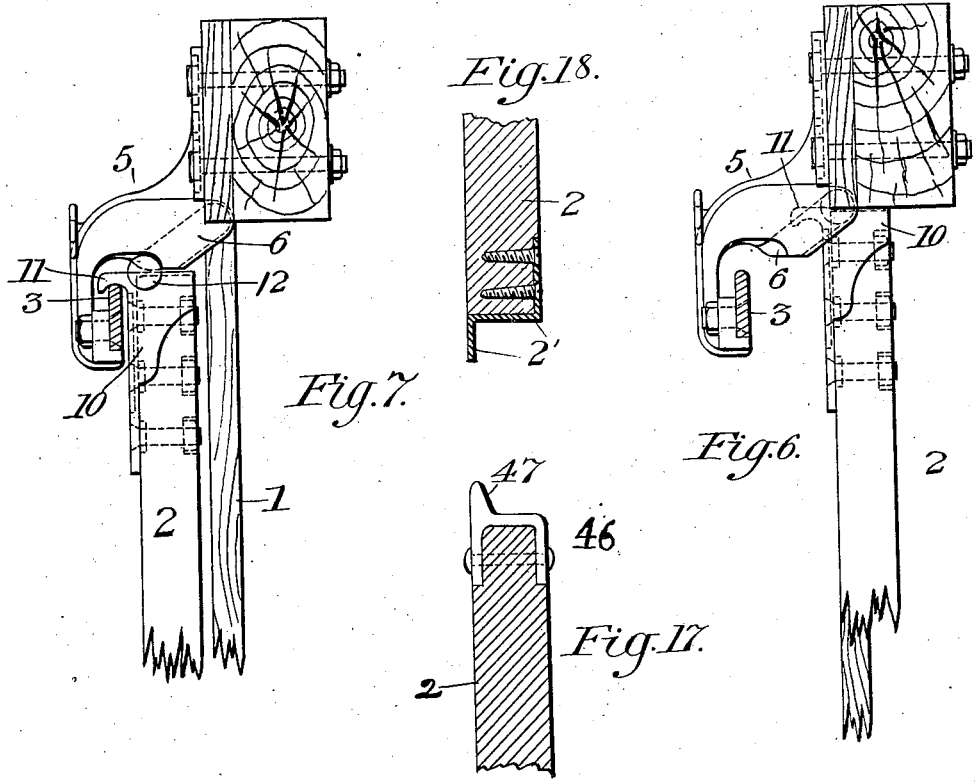
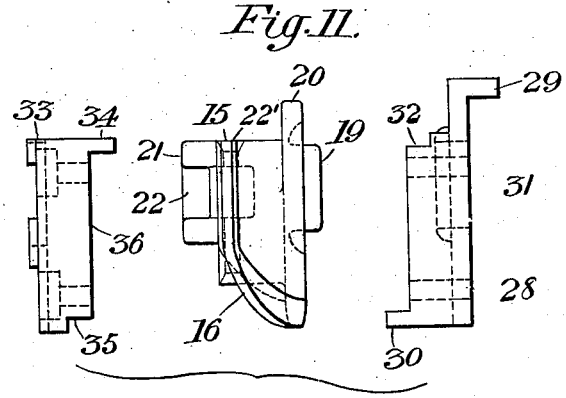
Witnesses:
O. W. Edelin
Clifford K. Berryman
Inventor:
Christopher F. Thomas.
by F. E. Stebbins
Atty No. 648,889. Patented May 1, 1900.
C. F. THOMAS.
CAR DOOR.
(Application filed May 29, 1899.)
(No Model.) 5 Sheets—Sheet 5.
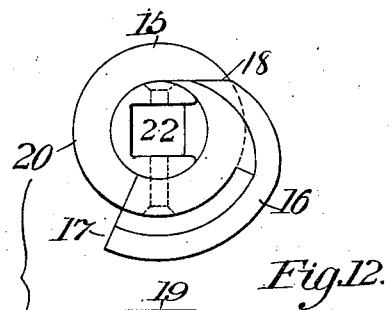
Fig. 12.
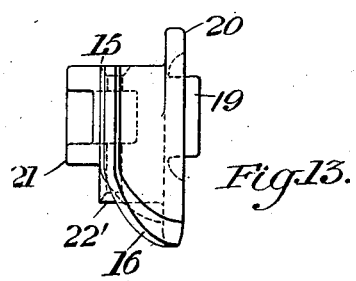
Fig. 13.
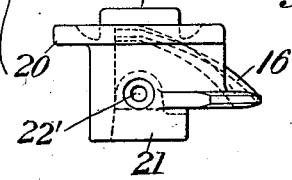
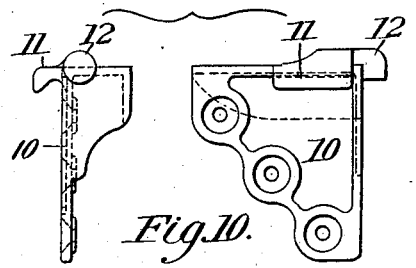
Fig. 10.
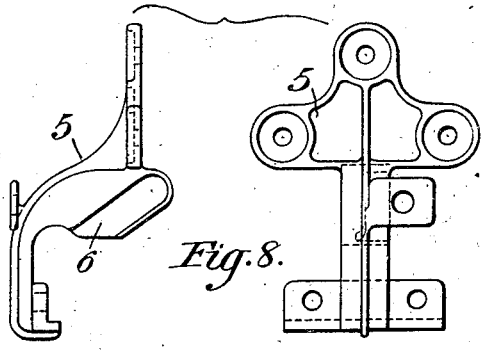
Fig. 8.
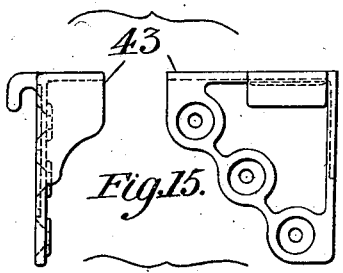
Fig. 15.
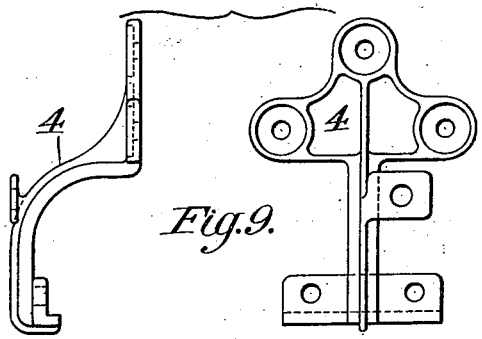
Fig. 9.
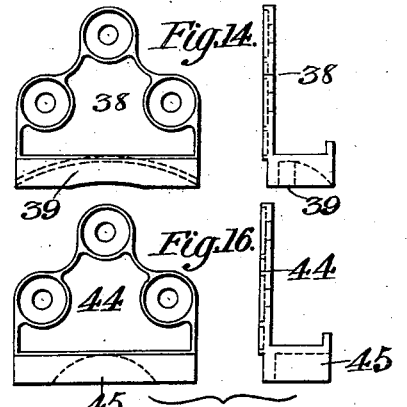
Fig. 14.
Fig. 16.
Witnesses
D. W. Edelin.
Clifford D. Benyman
Inventor
Christopher F. Thomas.
by F. E. Stebbins
Attorney

UNITED STATES PATENT OFFICE.

CHRISTOPHER F. THOMAS, OF ALEXANDRIA, VIRGINIA.

CAR-DOOR.

SPECIFICATION forming part of Letters Patent No. 648,889, dated May 1, 1900.

Application filed May 29, 1899. Serial No. 718,671. (No model.)

*To all whom it may concern:*

Be it known that I, CHRISTOPHER F. THOMAS, a citizen of the United States, residing at Alexandria, in the county of Alexandria and State of Virginia, have invented certain new and useful Improvements in Car-Doors and Fixtures, of which the following is a specification.

The objects of my invention are, first, the provision for freight or other cars of a solid door and means for supporting and operating the same and locking it flush when closed, and, second, the provision of locking means for slat or other doors which do not close flush with the car side, the said door and means to be so constructed that the door can easily and quickly be shifted from the track to its flush position and with equal facility be lowered and moved from in front of the door-opening and the locking means so fashioned and adapted that it will secure either a flush or other door in position.

With these main objects in view my invention consists in certain novelties of construction and arrangements and combinations of parts herein set forth, and specified in the claims.

The accompanying drawings illustrate one example of the physical embodiment of my improvements relating to the solid door and the so-called "fixtures," one modification of the centering device for the door, and one example of a slat or non-flush door, the said examples being embodied by the best modes I have so far devised for applying the general principles of the invention.

Figure 1:
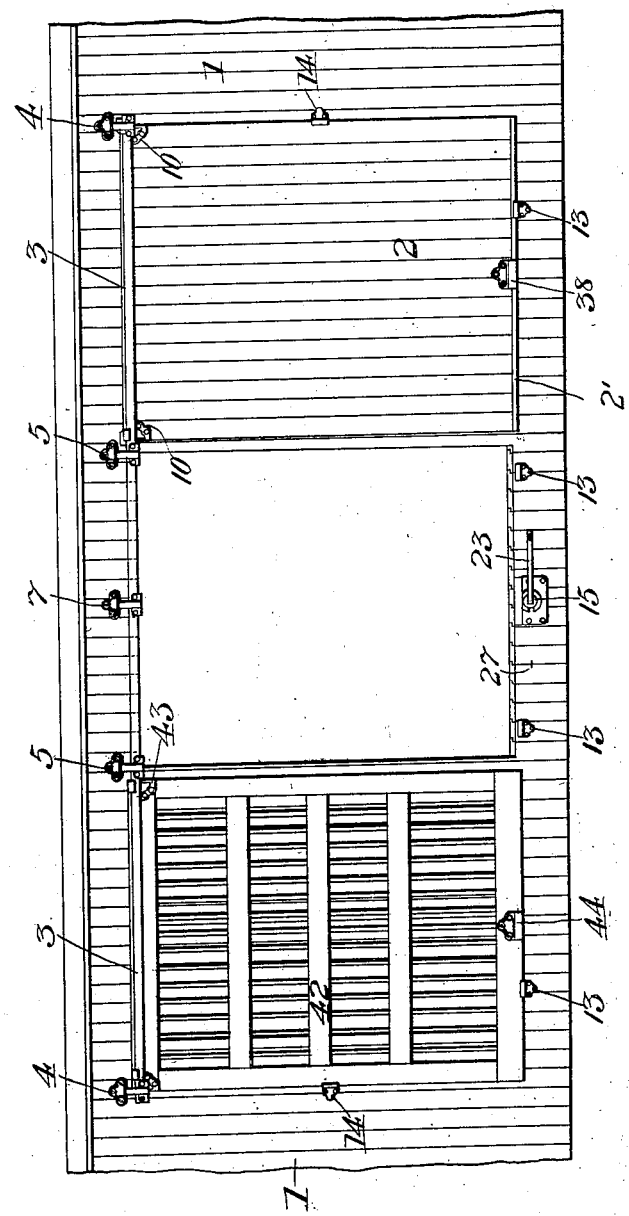
Figure 5:
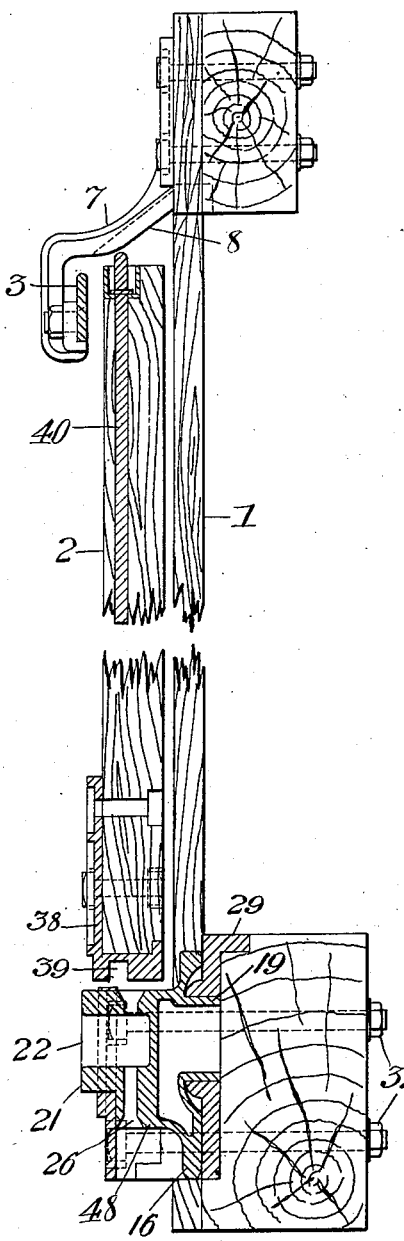
Figure 4:
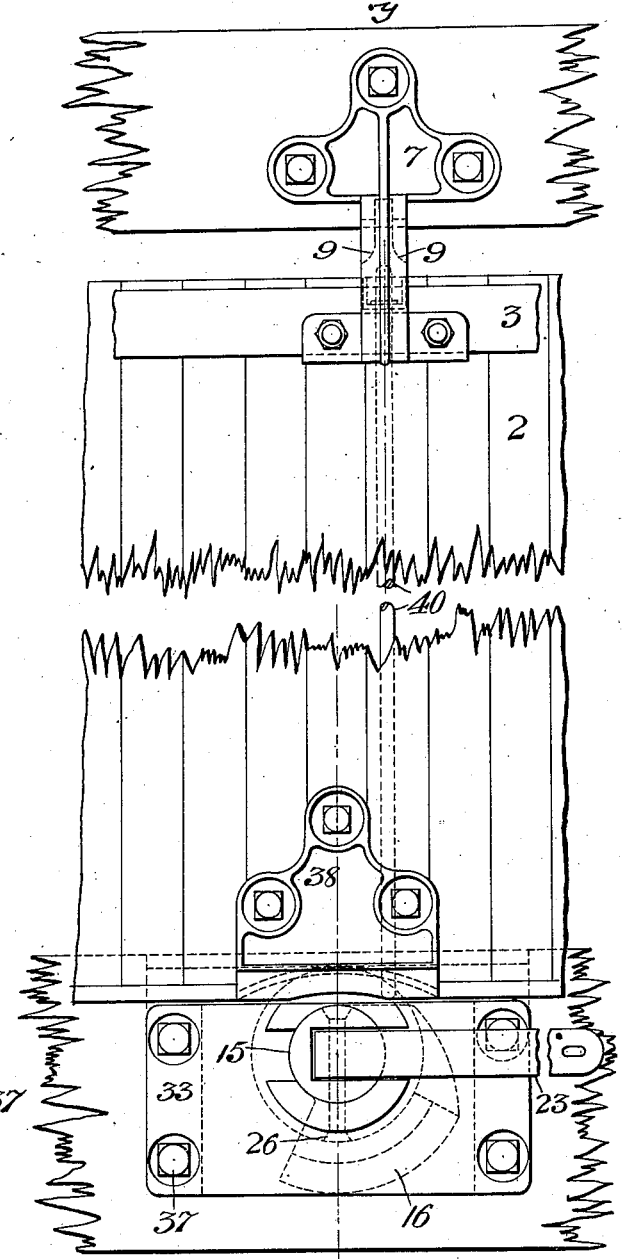

Figure 1 is a view in elevation of a section of a car side, showing a solid door and a slat door both in open positions. Fig. 2 is a section of a car side, showing the solid door closed flush and locked. Fig. 3 is a perpendicular section of Fig. 2, taken on line $x$ $x$. Fig. 4 is a view similar to Fig. 2 with the door dropped upon the door-track and in position to be moved away from the door-opening. Fig. 5 is a perpendicular section of Fig. 4, taken on line $y$ $y$. Fig. 6 is a section of an upper corner of the door and the adjacent portion of the car side, illustrating the relative positions of the door-hanger and a corner-bracket when the door is flush. Fig. 7 is a view similar to Fig. 6, but with the door lowered upon the track. Fig. 8 illustrates plan and side views of a door-track bracket, one being located adjacent each upper corner of the door-opening. Fig. 9 illustrates plan and side views of the end track-brackets. Fig. 10 shows plan and side views of a door-hanger adapted for use with a solid door. Fig. 11 illustrates the rotary screw-cam and the bearing therefor, the latter made in two parts and shown separated with the screw-cam between. Fig. 12 shows face, plan, and top plan views of the screw-cam. Fig. 13 is a side view of the screw-cam. Fig. 14 illustrates face and end views of the grooved plate used with the solid door. Fig. 15 shows face and end views of the hanger adapted for use with a slat door. Fig. 16 illustrates the plate adapted for use with the same door. Fig. 17 is a modified form of a centering device. Fig. 18 is a section through the bottom of the door, illustrating the form and location of the weather-strip.

Referring to the several figures, the numeral 1 designates a car side having a central opening, as usual in freight-cars; 2, a solid sliding door; 2', an iron weather-strip secured to the lower edge of the door, as shown; 3, an upper door-track, and 4 end track-brackets, which support the track in the usual way some distance from and parallel with the car-wall, one end of each bracket being bolted to the wall, as shown.

5 5 are the two track-brackets, which are located adjacent the upper corners of the door-opening; 6 6, oblique grooves made in the brackets, each bracket having one groove only, which faces the door-opening when the bracket is in position and slants relative to the length of the bracket.

7 is the central bracket, and 8 an oblique groove made in that side of the bracket which faces the door-opening.

9 9 are beveled edges of the metal, (shown in dotted lines, Fig. 4,) which constitute the boundaries of the groove at its lower end and increase its width or diameter at that point.

10 10 are the door-hangers, one located at each corner of the door.

11 11 are projecting arms grooved on the under sides and adapted to engage over the track and slide thereupon.

12 12 are journals or projections, one intogral with each hanger and adapted to slide into the grooves 6 6 in the brackets 5 5, located adjacent the corners of the door-opening.

13 represents door-guides bolted to the car side in line with the side sill, as shown.

14 represents door-stops which limit the movement of the door or doors on the track.

15 is a rotary screw-cam; 16, the cam thread or flange which extends from the point 17 to the point 18 in a spiral line.

19 is a cylindrical journal; 20, a flange; 21, a journal; 22, a recess cut away at one side only, as shown; 22', a bolt or rivet hole; 23, a lever-bar; 24, a slot at one end thereof; 25, a perforation at the other end; 26, a bolt or rivet with flush heads, which secures the end of the lever-bar loosely and pivotally in the recess 22 of the screw-cam; 27, a staple on the car side adapted to engage the slot 24 of the lever-arm.

28 is the inner half or part of a bearing adapted to receive the screw-cam.

29 is a flange which sets into the edge of the car-sill; 30, a lower flange; 31, a hole which receives the journal 19 of the screw-cam.

32 is a seat; 33, the outer half of the bearing for the screw-cam; 34, an upper flange thereof; 35, a recess to fit the flange 30 of the inner half of the bearing; 36, a perforation or hole to receive the journal 21 of the screw-cam.

37 represents bolts which fasten the bearing, with the inclosed screw-cam, to the car side.

38 is a plate bolted to the lower edge of the door adjacent the screw-cam; 39, a slot in the lower edge of the plate, curved, as shown by the dotted lines.

40 is a rod loosely fitting a longitudinal hole in the body of the door and constituting a centering device, the lower end adapted to be engaged by the screw-cam and the upper end when raised to enter the groove 8 in the central bracket.

41 is a washer on the rod to limit its downward movement.

42 is a slat or ventilating door.

43 represents hangers adapted for use with a slat door, the same being identical with the solid-door hangers, except that the journals or projections are omitted.

44 is a plate for use with a slat door; 45, a recess in the edge to receive the outer part of the screw-cam, and 46 is a modified form of centering device secured to the top edge of the door and provided with a point 47, which will engage the groove 8 in the central bracket 7 when the door is raised by the screw-cam.

It will be observed that the two halves of the bearing for the screw-cam are made with an open space sufficiently wide to allow the thread or flange of the screw-cam to freely rotate therein and that the said space is open at the bottom, so that dust and snow will not be retained and interfere with the operation of the cam. The hangers are shown with perforated lugs to receive bolts which support a weather-board; but these may be omitted, if desired.

The assembling of the several enumerated parts and castings will be obvious from an inspection of the drawings and need not be described.

The *modus operandi* of the solid door is as follows: The door being in open position, as shown in Fig. 1, and it being desired to close it flush, the door is first moved along the track toward the left till it is directly opposite the door-opening, as shown in Figs. 4, 5, and 7, and the rod 40 or point of the centering device 46 registers with the groove 8 in the central bracket 7. Then the lever-bar 23 in Fig. 4 is moved upwardly and rotated through an arc of one hundred and eighty degrees, so as to occupy the position shown in Fig. 2. This action rotates the screw-cam in its bearings, causes the thread or flange thereof to, first, strike the lower end of the rod 40 and advance the upper end thereof into the groove 8 of the bracket, and, second, to engage the slot 39 in the plate 38 and lift and force the door bodily into the opening, so that it will occupy the position shown in Figs. 2 and 3 flush with the wall of the car. It will be noticed that the groove 8 of the bracket 7, being larger at the bottom than at the top, will guide the centering device to the right or left, and with it the door, should the latter happen to be slightly out of line when moved in front of the opening. When the door is centered by the rod or device 46 at the top of the door, the journals or projections 12 12 on the hangers 10 10 will register with the grooves 6 6 in the corner-brackets 5 5, and as the door is lifted by the cam they will travel up the grooves and finally occupy the position shown in Fig. 6 of the drawings. A reverse movement of the lever 23 will allow the door to drop by gravity to the position shown in Fig. 7, where the arms 11 11 of the hangers 10 10 rest upon the track. A lock or fastening or seal of any kind may be employed to hold the lever-bar after it has been caused to engage the staple 27 on the car side.

The slat or other door 42 is not adapted to close flush, and therefore the particular hangers shown in Fig. 15 are employed to support it. The plate 44 shown in Fig. 16 is also of slightly-different construction from that shown in Fig. 14. The recess 45 in the plate is not a slot, but is open at one side, as indicated by dotted lines. This peculiarity allows the cam to lock the slat door in front of the opening without raising it from the track. Assuming the slat door to occupy a position similar to the position of the solid door shown in Fig. 5, the rotation of the screw-cam will not raise the door, as the thread or flange 16 will pass to one side of the plate, but the circular part of the screw-cam at 48 will engage the recess 45 and hold the door against endwise movement.

While I have shown in Fig. 1 both a solid door and a slat or ventilating door, either may be used without the other. In that case the stops 14 should be located differently. As illustrated, each door serves as a stop for the other when moved in front of the opening. Taken as a whole the pictured examples are only intended to represent the best modes for embodying my improvements and are not to be regarded as exhaustive of my invention. Many changes can be introduced in the form or shape of the castings at the discretion of the manufacturer and even some parts omitted or others substituted and my invention still be embodied. For instance, I may in some cases employ rollers to support the door on the track and dispense with the projections on the door-hangers and the grooves in the corner-brackets and use the central bracket and centering device only, or I may omit the centering device and use the corner-brackets to guide the door into a flush position. These and many other changes and modifications will not constitute a substantial departure.

What I claim is—

1. The combination with a movable door suitably supported, of a rotary screw-cam located adjacent the bottom of the door-opening and in a stationary position independent of the door and not movable with it; said screw-cam adapted when rotated to engage the door when in a position in front of the opening, and lock it; in substance as set forth.

2. The combination with a movable door suitably supported, of a rotary screw-cam located adjacent the bottom of the door-opening and independent of and not movable with the door; the said screw-cam adapted when rotated to engage and shift the door in the direction of the door-opening; in substance as set forth.

3. The combination with a movable door suitably supported, of a rotary screw-cam located adjacent the bottom of the door-opening and independent of the door; said screw-cam adapted when rotated to elevate and shift the door in the direction of the door-opening; in substance as set forth.

4. The combination with a movable door suitably supported, of a rotary screw-cam independent of the door; said screw-cam adapted when rotated in one direction to shift the door to a flush position, and when rotated in the opposite direction to move the door away from the door-opening; in substance as set forth.

5. The combination with a door, of the screw-cam having journals 19 and 21 supported in bearings 28 and 33, and a flange or thread 16; and a plate, as 38, provided with a slot, as 39; in substance as set forth.

6. The combination with a movable door suitably supported, of a screw-cam independent of the door; bearings for the cam also independent of the door; and a lever-bar; the thread of the said cam adapted to engage and move the said door; in substance as set forth.

7. The combination with a movable door suitably supported, and provided with a slotted plate, of a stationary screw-cam; said screw-cam when rotated being adapted to engage the plate on the door and shift the same; in substance as set forth.

8. The combination with a movable door, of a stationary rotary screw-cam independent of the door; and a lever-bar pivoted to the end of the screw-cam; said lever-bar adapted to be thrown out from the plane of the door to a position oblique thereto when the screw-cam is to be revolved; in substance as set forth.

9. The combination with a movable door, of means for elevating and shifting the same; and a centering device adapted to come into engagement with a fixed element when the door is elevated and move the said door laterally; in substance as set forth.

10. The combination with a movable door, and fixtures, constructed substantially as set forth, of a grooved bracket; and a centering device on the door adapted to engage the bracket and move the door laterally; in substance as set forth.

11. The combination with a movable door, constructed substantially as set forth, of a centering device; and a bracket having a groove 8 and the metal removed at 9, 9, to form beveled edges; as and for the purpose specified.

12. The combination with a movable door, of means for elevating and shifting the same; hangers on the door; and brackets adjacent the door-opening; said hangers and brackets being provided with grooves and projections which intermesh; whereby the door is guided in its movements; in substance as set forth.

13. The combination with a movable door, of hangers having projections; and brackets having oblique grooves and adapted to receive the projections and guide the door in its upward and downward movements; in substance as set forth.

14. The combination with a movable door, of hangers provided with arms; brackets supporting a track; and a screw-cam for raising the door from the track and moving it to a closed position; in substance as set forth.

15. The combination with a movable door, of hangers having arms; brackets supporting the track which is engaged by the arms of the hangers; a screw-cam; and a centering device; in substance as set forth.

16. The combination with a movable door supported by hangers upon a top door-track, of a screw-cam adapted when rotated to shift the door sidewise and close the door-opening; in substance as set forth.

17. The combination with a movable door supported upon a top door-track, of a screw-cam adapted when rotated to elevate and shift the door flush; in substance as set forth.

18. The combination with a door supported and movable upon a top door-track, of a rotary cam independent of the door and adapted to engage a recessed plate on the door and lock it in a closed position; in substance as set forth.

19. The combination with a movable door, of a screw-cam; a rod, as 40, adapted to be moved by the cam; and a grooved bracket; in substance as set forth.

20. The combination with a movable door, of a screw-cam independent of the door; a lever-bar pivoted to the end of the screw-cam; and a staple as 27; in substance as set forth.

21. The combination with a door having at the top hangers provided with arms and at the bottom a grooved plate, of a top door-track supported by the brackets; a screw-cam; means for rotating the screw-cam and causing it to engage the grooved plate and shift the door from the track to a closed position; in substance as set forth.

In testimony whereof I affix my signature in presence of two witnesses.

CHRISTOPHER F. THOMAS.

Witnesses:
H. R. BURKE,
A. H. ROGERS.